(12) United States Patent
Jung et al.

(10) Patent No.: US 8,478,983 B2
(45) Date of Patent: Jul. 2, 2013

(54) METHOD AND APPARATUS FOR PRESERVING SECURITY IN VIDEO MULTICASTING SERVICE

(75) Inventors: Soon-Heung Jung, Daejeon (KR); Jeong Ju Yoo, Daejeon (KR); Jin Woo Hong, Daejeon (KR); Kwang-Deok Seo, Daejeon (KR); Jae-Hyung Hwang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 294 days.

(21) Appl. No.: 12/809,376

(22) PCT Filed: Dec. 15, 2008

(86) PCT No.: PCT/KR2008/007412
§ 371 (c)(1),
(2), (4) Date: Jun. 18, 2010

(87) PCT Pub. No.: WO2009/078641
PCT Pub. Date: Jun. 25, 2009

(65) Prior Publication Data
US 2011/0055550 A1 Mar. 3, 2011

(30) Foreign Application Priority Data

Dec. 18, 2007 (KR) .................. 10-2007-0133226
Feb. 14, 2008 (KR) .................. 10-2008-0013496

(51) Int. Cl.
*H04L 21/00* (2006.01)
(52) U.S. Cl.
USPC .......................... 713/151; 380/201

(58) Field of Classification Search
USPC ................... 713/151; 380/201; 370/352
See application file for complete search history.

(56) References Cited

U.S. PATENT DOCUMENTS

| 2007/0116277 A1* | 5/2007 | Ro et al. ............... 380/201 |
| 2007/0201549 A1* | 8/2007 | Hannuksela et al. .... 375/240.01 |
| 2009/0083434 A1* | 3/2009 | Wang et al. ............ 709/231 |
| 2010/0067522 A1* | 3/2010 | Jung et al. ............ 370/352 |
| 2010/0280832 A1* | 11/2010 | Ojala et al. ........... 704/500 |

FOREIGN PATENT DOCUMENTS

| KR | 1020040026315 | 3/2004 |
| KR | 10-0662350 | 12/2006 |
| KR | 10-0711635 | 4/2007 |
| KR | 10-0776680 B1 | 11/2007 |

* cited by examiner

*Primary Examiner* — Jeffrey Pwu
*Assistant Examiner* — William Corum, Jr.
(74) *Attorney, Agent, or Firm* — Nelson Mullins Riley & Scarborough LLP; EuiHoon Lee, Esq.

(57) ABSTRACT

A method and an apparatus for maintaining information security in a video multicasting service are provided. The method includes: generating a network abstraction layer unit using received video information; encrypting the network abstraction layer unit of the video information; realtime transport protocol (RTP) packetizing the encrypted network abstraction layer unit of the video information; recording unit format information and field information, included in the network abstraction layer of the video information being stored in a memory, in a header extension field of the RTP header; and transmitting the RTP packet including the encrypted video information to a routing device.

13 Claims, 7 Drawing Sheets

B : BASE LAYER
E1 : ENHANCEMENT LAYER 1
E2 : ENHANCEMENT LAYER 2
E3 : ENHANCEMENT LAYER 3

Fig. 4

```
+---------------+
|0|1|2|3|4|5|6|7|
+-+-+-+-+-+-+-+-+
|F| NRI |  TYPE  |
+---------------+
```

Fig. 5

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|F| NRI | TYPE |R|I|   PRID    |N| DID |   QID   | TID |U|D|O|RR|
+-+-+-+-+-+-+-+-+-+-+-+-+-+-+-+-+-+-+-+-+-+-+-+-+-+-+-+-+-+-+-+-+
```

METHOD AND APPARATUS FOR PRESERVING SECURITY IN VIDEO MULTICASTING SERVICE

RELATED APPLICATIONS

This application is a 35 U.S.C. §371 national stage filing of PCT Application No. PCT/KR2008/007412 filed on Dec. 15, 2008, which claims priority to, and the benefit of, Korean Patent Application No. 10-2007-0133226 filed on Dec. 18, 2007 and Korean Patent Application No. 10-2008-0013496 filed on Feb. 14, 2008. The contents of the aforementioned applications are hereby incorporated by reference.

TECHNICAL FIELD

The present invention relates to a method and an apparatus for maintaining information security in a video multicasting service, and more particularly, to a method and an apparatus for maintaining information security which is able to provide a service while maintaining information security, in a scheme of a multicasting service utilizing scalable video coding (SVC).

This work was supported by the IT R&D program of MIC/IITA [2005-S-103-03, The Development of Ubiquitous Contents Service in Integrated Fusion Environments].

BACKGROUND ART

In a conventional multicasting method utilizing a transcoder which considers various network environments and types of terminals as illustrated in FIG. 1, a new bitstream with a frame rate, bit rate, and resolution rate corresponding to conditions for communication of an individual terminal using a transcoder embedded in a routing device.

FIG. 1 is a diagram illustrating a conventional multicasting method.

The conventional multicasting method is for maintaining information security and for adopting encryption and decoding.

That is, a compressed video is encrypted, the encrypted video is loaded on a portion of payload of a realtime transport protocol (RTP) packet to be transmitted to a transcoder, a header of the RTP packet is revealed prior to transcoding, the encrypted video data is decoded, and an original video stream is restored.

By transcoding the restored bitstream, a new bitstream with a desired frame rate, bit rate, and resolution rate is generated, and encryption is performed with respect to the generated new bitstream to be transmitted to a client terminal in order to maintain security.

Since transcoding is possible only in case of approaching to contents of a payload of a received packet, sequential operations of encrypting and decoding in a router are necessary resulting in an increase in an amount of calculations and latency, and it is impossible to securely maintain video information since an original bitstream is restored in a router.

DISCLOSURE OF INVENTION

Technical Problem

In order to achieve the objectives described above, and also to solve the problems of the conventional art, the present invention is provided to transmit scalable video coding (SVC) network abstraction layer units, transmitted from a server in a multicasting service based on SVC, to a client with information security being maintained.

The present invention also provides a multicasting method capable of maintaining information security between a server and a client.

The present invention also is provided to immediately perform a packet filtering process without decoding with respect to encrypted data received in a routing device, thereby reducing an amount of calculations and latency.

Technical Solution

According to an aspect of the present invention, there is provided a method for maintaining information security in a video multicasting service including: generating a network abstraction layer unit using received video information; encrypting the network abstraction layer unit of the video information; realtime transport protocol (RTP) packetizing the encrypted network abstraction layer unit of the video information; recording unit format information and field information, included in the network abstraction layer of the video information being stored in a memory, in a header extension field of the RTP header; and transmitting the RTP packet including the encrypted video information to a routing device.

In an aspect of the present invention, the present invention further includes: extracting the unit format information and field information, included in the network abstraction layer of the video information, to store the extracted unit format information in the memory.

According to an aspect of the present invention, there is provided a method for routing a secured information packet in a video multicasting service including: receiving an RTP packet including encrypted video information; extracting unit format information and field information, included in a network abstraction layer being recorded in a header extension field of an RTP header with respect to the received RTP packet; and transmitting the network abstraction layer unit to a client terminal corresponding to the extracted unit format information and the field information.

In order to achieve the objectives described above, and to solve the problems of the conventional art, according to an aspect of the present invention, there is provided an apparatus for maintaining information security in a video multicasting service including: a unit generator generating a network abstraction layer unit using received video information; a memory extracting unit format information and field information, included in the network abstraction layer unit of the video information to store the extracted unit format information and field information; an information encryption module encrypting the network abstraction layer unit of the video information; an information packetizer RTP packetizing the encrypted network abstraction layer unit of the video information; an information recorder recording unit format information and field information, included in the network abstraction layer of the video information being stored in a memory, in a header extension field of the RTP header; and an information transmitter transmitting the RTP packet including the encrypted video information to a routing device.

In the video multicasting service according to an embodiment of the present invention, a routing device of an information secured packet: extracts unit format information and field information, included in the network abstraction layer being recorded in a header extension field of an RTP header with respect to the received RTP packet; and transmits the network abstraction layer unit to a client terminal corresponding to the extracted unit format information and the field information.

BRIEF DESCRIPTION OF THE DRAWINGS

FIG. 4 is a diagram illustrating a structure of a header of a network abstraction layer unit used in a base layer of SVC according to an embodiment of the present invention;

FIG. 5 is a diagram illustrating a structure of a header of a network abstraction layer unit used in enhancement layers of SVC according to an embodiment of the present invention;

MODE FOR THE INVENTION

Figure 1:
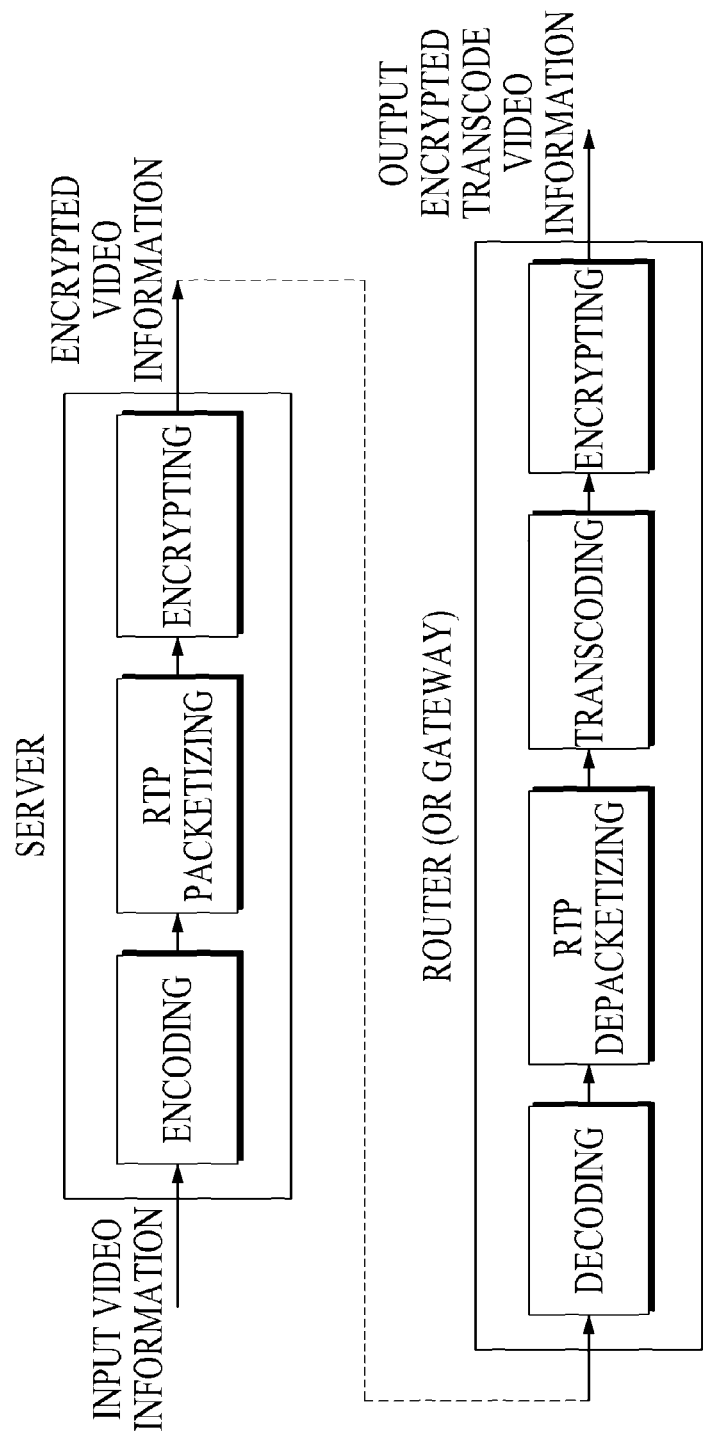
FIG. 1 is a diagram illustrating a conventional multicasting method.

Hereinafter, reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

The present invention is based on a new scalable extension coding technique, which is developed to solve problems existing in scalability based on layered coding such as low efficiency for compression, inability to support combined scalability, and high complexity for implementation, the scalability being based on layered coding and carried out by Scalable video coding (SVC) of H.264 of a scalable extension coding technique adopting Moving Picture Experts Group (MPEG)-2 and MPEG-4.

The SVC encodes a plurality of video layers into a single bitstream, and the layers of the SVC consist of a single base layer and scalable enhancement layers which are sequentially stackable on top of the base layer.

Each enhancement layer is capable of representing up to a maximum bit rate, a frame rate, and a resolution based on information of a lower layer.

Also, in the SVC, due to sequentially stacking scalable layers, it is possible to support various bit rates, frame rates, and resolutions, and accordingly the present invention is based on an encoding technique suitable for a multimedia contents service in the Universal Multimedia Access (UMA) environment that may solve various problems such as various bandwidths from heterogeneous network environments, problems of various performances levels and resolutions supported by receiving terminals, and problems of various preferences of contents consumers.

The SVC may store encoding information of a temporal and spatial scalability, as well as a signal to noise ratio scalability, in a single bitstream, and, via various combinations of the three scalability information, may support broad ranges of combined scalability.

In this instance, to realize the combined scalability, the apparatus for multicasting service according to an embodiment of the present invention generates base layer encoding information and scalability encoding information of scalable layers in a slice unit from a video coding layer (VCL).

Each slice described above is generated as a network abstraction layer (NAL) unit in an NAL to be stored in an SVC bitstream.

To distinguish relations between each of the SCV network abstraction layer unit and the enhancement layers without decoding a bitstream, temporal_level_ID (TID), dependency_id (DID), and quality_level_ID (QID) fields exist in a header of each SVC network abstraction layer unit.

The TID represents hierarchies between the temporal layers for a temporal scalability, the DID represents a dependency hierarchy between an upper and a lower enhancement layers for an inter-layer prediction of spatial scalability, and the QID represents hierarchies between Fine Granularity Scalability (FGS) layers to support an SNR scalability.

Figure 2:
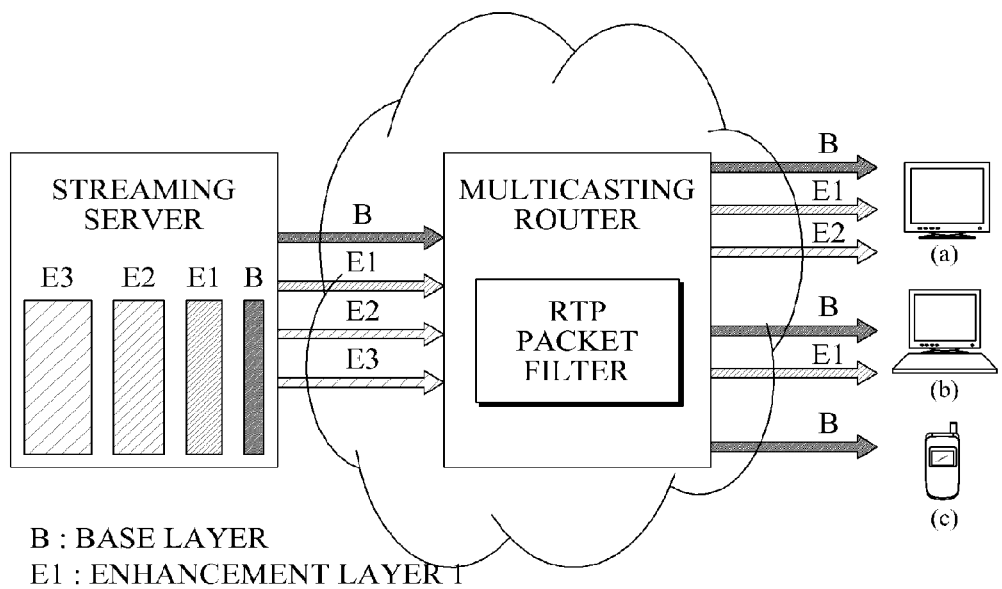
FIG. 2 is a block diagram illustrating an embodiment of a multicasting service based on scalable video coding (SVC) according to an embodiment of the present invention.

FIG. 2 is a block diagram illustrating an embodiment of a multicasting service based on SVC according to an embodiment of the present invention.

As illustrated in FIG. 2, the present invention is based on a general service architecture in the case of providing a multicasting service using an SVC compressed videos.

Here, it is assumed a multicasting service using an SVC bitstream consists of a single base layer and three enhancement layers which are compatible with H.264.

According to an embodiment of the present invention, when all of network abstraction layer units, which configure an SVC bitstream with a total four layers including a base layer, are transmitted to a multicast routing device (or a gateway) via realtime transport protocol (RTP) sessions, the routing device extracts only the SVC network abstraction layer units corresponding to a suitable resolution, quality, and frame rate information for each receiving terminal and a channel bandwidth from the all received SVC network abstraction layer units, and transmits the extracted SVC network abstraction layer units to each client terminal, thereby providing the multicast service.

As an example, in the case terminal (a) in FIG. 2 is provided base layer B and upper two enhancement layers of E1+E2, the routing device performs filtering with respect to network abstraction layer corresponding to base layer B and upper two enhancement layers of E1+E2 via an RTP packet filter to transmit the extracted network abstraction layer units to terminal (a).

As another example, in the case of terminal (b), since capability of a terminal and a channel bandwidth is capable of receiving up to base layer B and enhancement layer E1, the routing device extracts network abstraction layer units corresponding to base layer B and enhancement layer E1 to deliver the extracted network abstraction layer units to terminal (b).

As still another example, in the case of terminal (c), terminal (c) is capable of receiving base layer B and enhancement layer E1 due to a fact that a terminal (c) lacks channel bandwidths, the routing device extracts network abstraction layer units corresponding to base layer B and E1 to transmit the extracted network abstraction layer units to terminal (c).

When an SVC network abstraction layer unit is transmitted in an IP network such as the Internet, a real-time transport protocol (RTP) is used. In such case, the SVC network abstraction layer unit is transmitted via an RTP packet in a duration between a multi-streaming server and a routing device and between a routing device and a client terminal.

Figure 3:
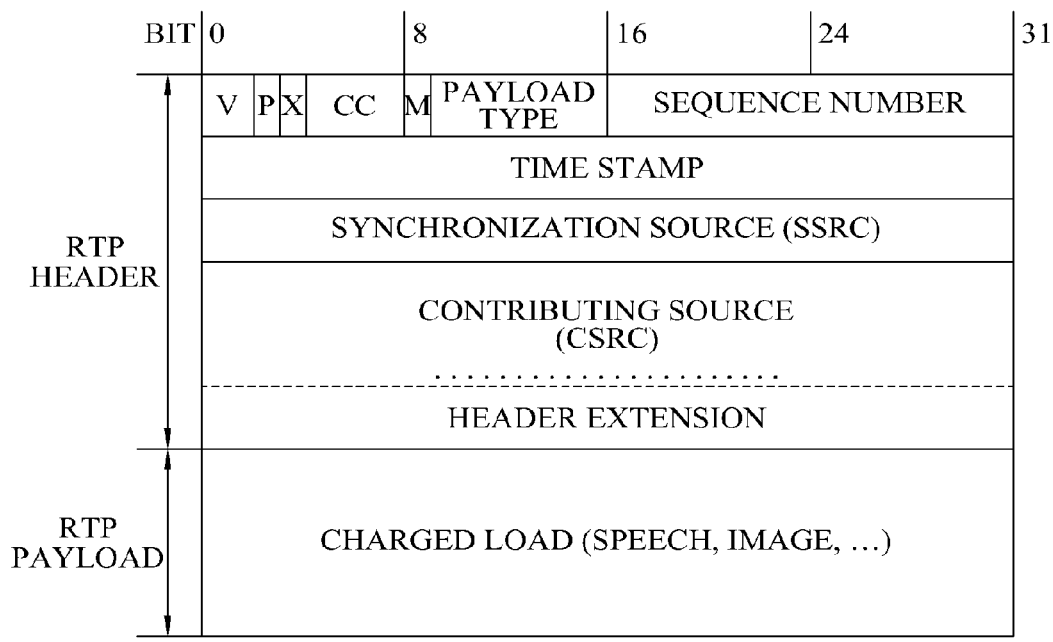
FIG. 3 is a diagram illustrating an embodiment of a structure of a realtime transmission protocol (RTP) packet according to an embodiment of the present invention.

FIG. 3 is a diagram illustrating an embodiment of a structure of a realtime transmission protocol (RTP) packet according to an embodiment of the present invention.

The RTP packet in FIG. 3 is largely divided into a header portion and a payload portion, and a structure of the RTP header includes a base header with a fixed size of 12 bytes and a header extension which can be selectively used depending on a user's needs.

In the present invention, there is provided a multicasting method capable of maintaining information security between a server and a client by enabling SVC network abstraction layer units to be transmitted from the server to the client maintaining the information security in a multicasting service based on SVC.

Specifically, the present invention may reduce an amount of calculations and latency required for a process by immediately performing a packet filtering process without applying decoding to encrypted data received in a routing device.

Such encoding information generated through the SVC encoding is stored in a bitstream in a network abstraction layer unit.

FIG. 4 illustrates a structure of a header of a network abstraction layer unit used in a base layer of SVC, and FIG. 5 illustrates a structure of a header of a network abstraction layer unit used in an enhancement layer of SVC.

The network abstraction layer unit consists of a network abstraction layer header portion and a network abstraction layer payload portion. The structure of the network abstraction layer unit generated in the base layer as illustrated in FIG. 4 differs from the structure of the header of the network abstraction layer unit generated in the enhancement layer as illustrated in FIG. 5.

Specifically, FIG. 4 illustrates the structure of the header of 1 byte which configures the network abstraction layer unit generated in the base layer of SVC compatible with H.264, whereas FIG. 5 illustrates the structure of the header of 4 bytes which configures the network abstraction layer unit generated in the enhancement layer of SVC.

In the present invention, the spatio-temporal hierarchy is induced from TID, DID, and QID field information defined in a header of each network abstraction layer unit of the enhancement layer among the above two layers with respect to each network abstraction layer unit, and a network abstraction layer unit corresponding to a desired frame rate, bit rate and resolution is extracted, and the extracted network abstraction layer unit may be provided.

Figure 6:
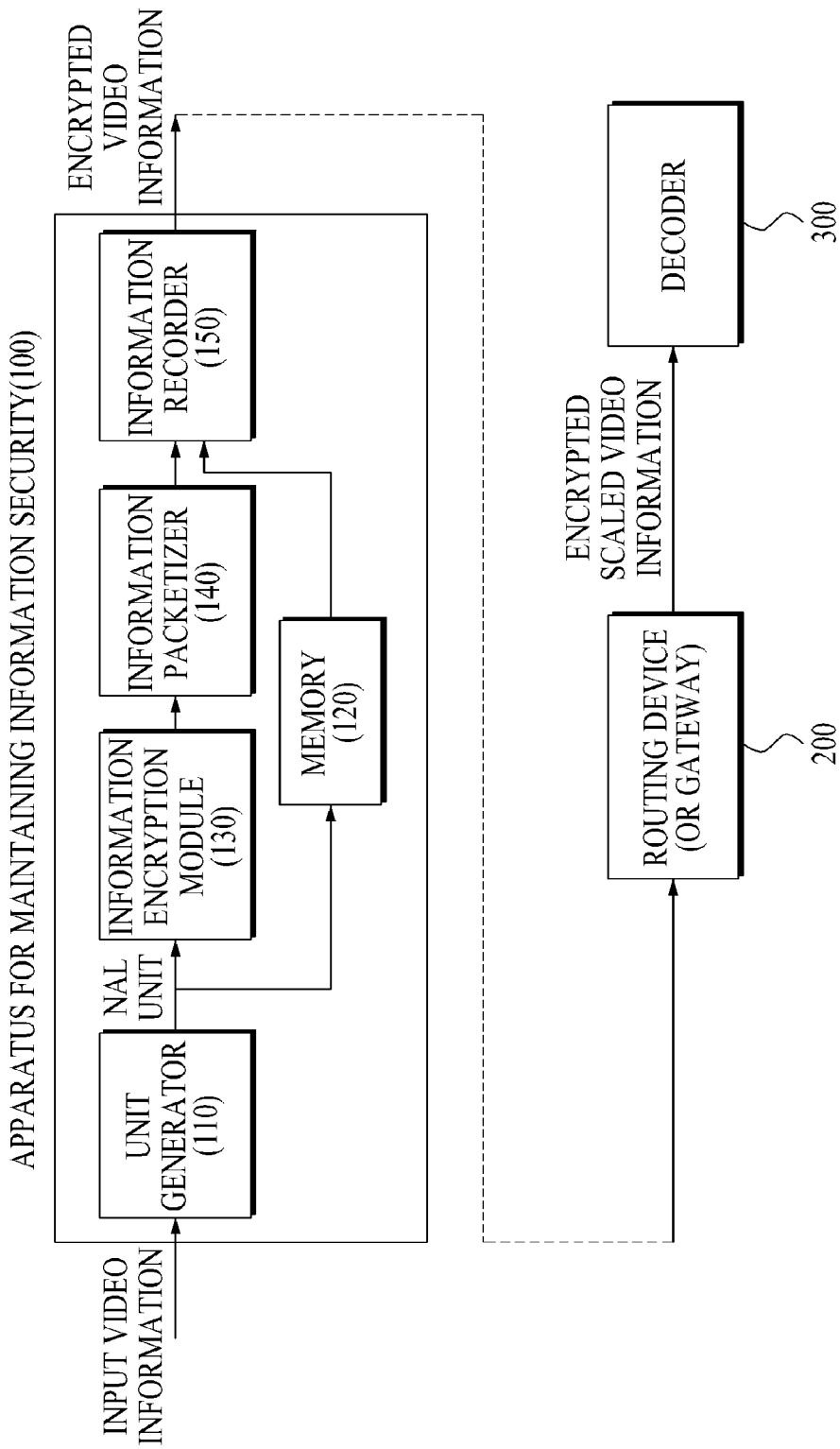
FIG. 6 is a block diagram illustrating a configuration of an apparatus for maintaining information security in a video multicasting service according to an embodiment of the present invention.
Figure 7:
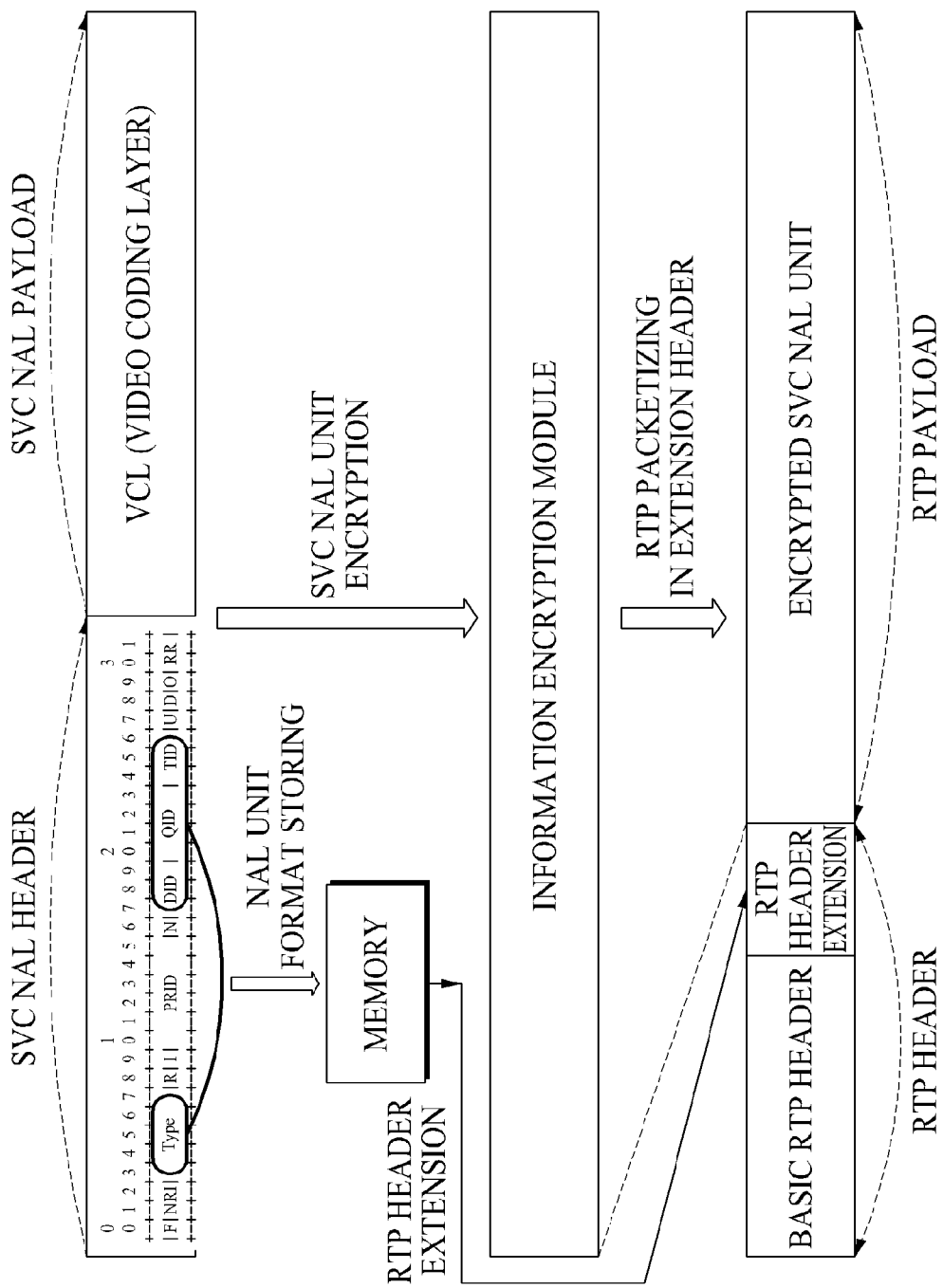
FIG. 7 is a block diagram illustrating a detailed configuration of an apparatus for maintaining information security in a video multicasting service according to an embodiment of the present invention.

FIG. 6 is a block diagram illustrating a configuration of an apparatus for maintaining information security in a video multicasting service according to an embodiment of the present invention, and FIG. 7 is a block diagram illustrating a detailed configuration of an apparatus for maintaining information security in a video multicasting service according to an embodiment of the present invention.

The apparatus for maintaining information security in the video multicasting service according to the present invention is based on a method which effectively utilizes a network abstraction layer (NAL) unit type illustrated in FIG. 5 and TID, DID, and QID field information.

The present invention arranges an order of operations of RTP packetizing and encryption in an inverse order, applies encryption to a SVC network abstraction layer unit prior to applying RTP packetizing, and thus encryption is not applied to a header portion of an RTP packet, a routing device may promptly access to information of the header portion in the received RTP packet without the decoding process, and it is possible to perform RTP packet filtering at a high speed.

Based on the above method, the configuration of the present invention will be sequentially described by referring to FIGS. 6 and 7.

First, a unit generator 110 generates a network abstraction layer unit using received video information.

The video data is information in a form of SVC, and the unit generator 110 compresses the received video information to generate the network abstraction layer unit.

In this instance, a memory 120 extracts unit format information and field information, included in the network abstraction layer of the video information to store the extracted unit format information and field information.

The unit format information includes various information, in particular includes TID information of hierarchies between the temporal layers, DID information of a dependency hierarchy between an upper and a lower enhancement layers, QID information of hierarchies between Fine Granularity Scalability (FGS) layers, and the like.

Next, an information encryption module 130 encrypts the network abstraction layer unit of the video information.

Next, an information packetizer 140 realtime transmission protocol packetizes the encrypted network abstraction layer unit of the video information.

In this instance, the information packetizer 140 loads the network abstraction layer unit of the encrypted video information on a payload of a RTP protocol to packetize the loaded network abstraction layer unit.

In the present invention, in the case of RTP packetizing the network abstraction layer unit of the encrypted video information, the packetizing process is performed by extending a header space of the RTP.

Next, an information recorder 150 records unit format information and field information, included in the network abstraction layer of the video information being stored in the memory 120, in a header extension field of the RTP header.

Finally, an information transmitter transmits the RTP packet including the encrypted video information to a routing device 200.

In this instance, the routing device 200, having received the RTP packet including the encrypted video information, extracts the unit format information and field information included in a network abstraction layer being recorded in a header extension field of an RTP header, with respect to the received RTP packet.

Also, the routing device 200 transmits the network abstraction layer unit to the client terminal corresponding to the extracted unit format information and the field information.

Also, the routing device 200 may increase a processing speed since it does not perform processes of the information decoding, the RTP packetizing, and information encrypting in the process of the extracting the unit format information and the field information included in the network abstraction layer unit.

In this instance, according to the present invention, it is possible to decode the network abstraction layer unit prior to transmitting to the client terminal, and to transmit the decoded network abstraction layer unit to the client terminal.

The present invention may further include a decoder performing decoding, and the decoder may include a receiver receiving a network abstraction layer unit from the routing device 200 and a decoding unit decoding the received abstract layer unit into a format corresponding to the client terminal.

In this instance, the routing device 200 receives an RTP packet including the encrypted video information, extracts the unit format information and field information included in the network abstraction layer unit being recorded in the header extension field of the RTP header, and transmits the network abstraction layer unit to the receiver corresponding to the extracted unit format information and field information, thereby decoding the network abstraction layer unit.

As described above, by using an integrated location management device 200, the present invention arranges the order of processes of the RTP packetizing and encryption in the inverse order, applies encryption with respect to an SVC NAL unit prior to the RTP packetizing, and applies the RTP packetizing so that the routing device 200 accessing to information in the header of the RTP packet without encryption.

Also, the present invention provides a method for RTP packetizing filtering at a high speed.

The method for maintaining information security and functional aspects of a configuration of the apparatus 200 for maintaining the information security will be described by referring to FIG. 8 in a sequential order.

Figure 8:
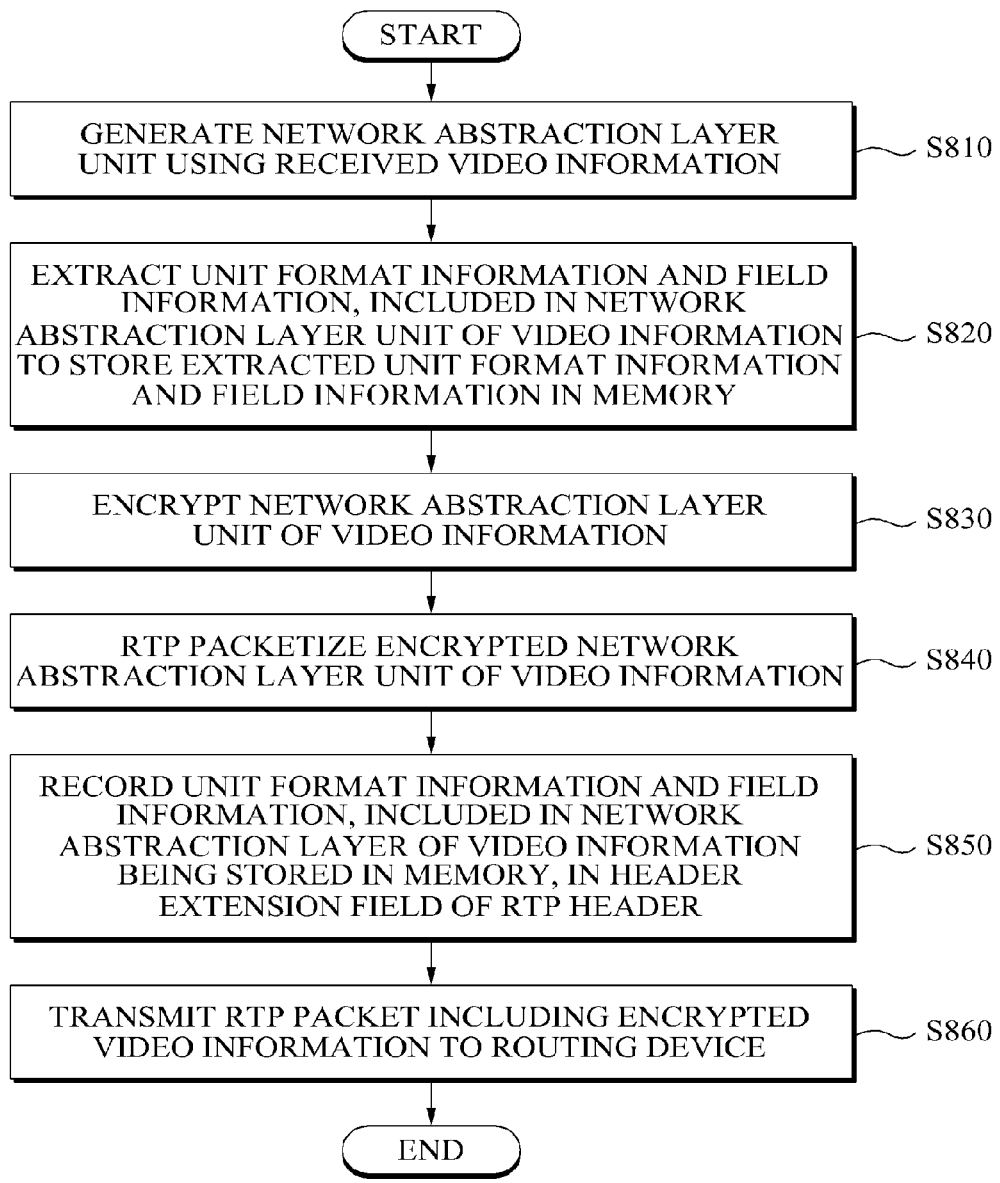
FIG. 8 is a flowchart illustrating a method for maintaining information security in a video multicasting service according to an embodiment of the present invention.

FIG. 8 is a flowchart illustrating a method for maintaining information security in a video multicasting service according to an embodiment of the present invention.

Since description regarding the method for maintaining information security in the video multicasting service corresponds to the description regarding the method for using the apparatus 200 for maintaining information security, a detailed description thereof will be omitted.

First, a unit generator 110 generates a network abstraction layer unit using received video data in operation S810.

In operation S820, a memory 120 stores unit format information and field information included in the network abstraction layer unit of the video information.

In operation S830, an information encryption module 130 encrypts the network abstraction layer unit of the video information.

In operation S840, an information packetizer 140 RTP packetizes the encrypted network abstraction layer unit of the video information.

In operation S850, an information recorder 150 records the unit format information and field information, included in the network abstraction layer of the video information being stored in the memory 120, in a header extension field in a header of the RTP header.

In operation S860, an information transmitter transmits the RTP packet including the encrypted video information to a multicasting routing device 200.

In this instance, the routing device 200 receives the RTP packet including the encrypted video information and transmits information to a client terminal via the following process.

Figure 9:
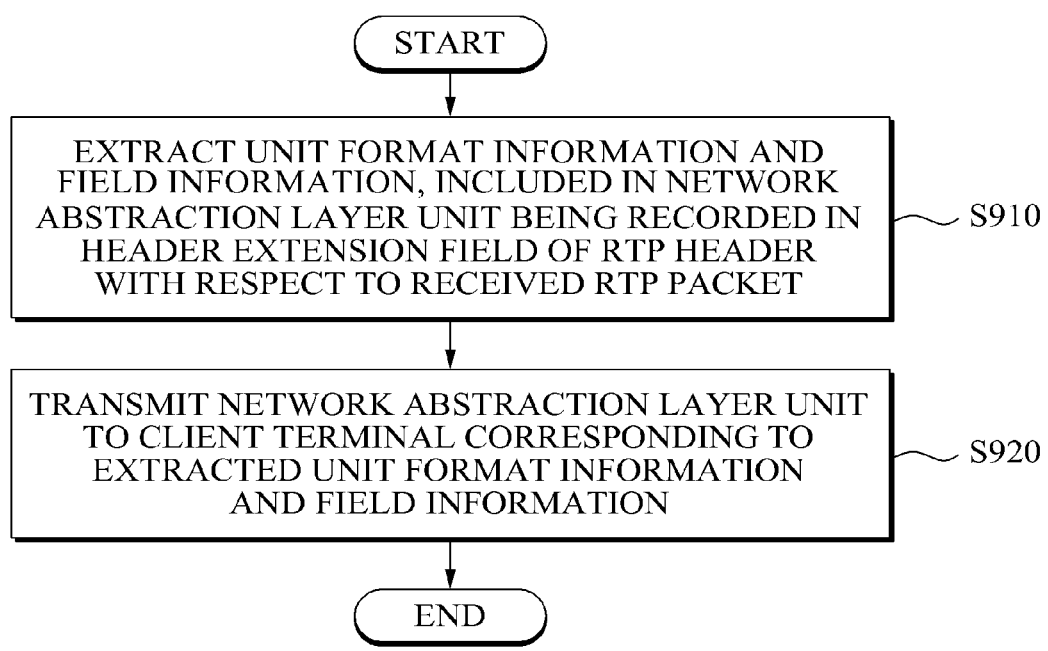
FIG. 9 is a flowchart illustrating a method of extracting information in a routing device according to an embodiment of the present invention.

FIG. 9 is a flowchart illustrating a method of extracting information in a routing device according to an embodiment of the present invention.

As illustrated in FIG. 9, the routing device 200 having received the RTP packet including the encrypted video information extracts unit format information and field information included in a network abstraction layer unit being recorded in the header extension field of the RTP protocol header in operation 5910.

Finally, in operation 5920, the routing device 200 transmits the network abstraction layer unit to the client terminal which corresponds to the extracted unit format information and field information.

The method for maintaining information security according to the above-described exemplary embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like, including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

INDUSTRIAL APPLICABILITY

According to the present invention, it is possible to transmit scalable video coding (SVC) network abstraction layer units, transmitted from a server in a multicasting service based on SVC, to a client with information security being maintained.

Also, according to the present invention, it is possible to maintain information security between a server and a client.

Also, according to the present invention, it is possible to immediately perform a packet filtering process without decoding with respect to encrypted data received in a routing device, thereby reducing an amount of calculations and latency.

The invention claimed is:

1. A method for maintaining information security in a video multicasting service, the method comprising:
generating a network abstraction layer unit using received video information, the network abstraction layer unit including network abstraction layer (NAL) Unit Type information and dependency_ID (DID), temporal_level_ID (TID) and quality_level_ID (QID) information;
extracting the NAL Unit Type information and the DID, TID and QID information from the network abstraction layer unit;
encrypting the network abstraction layer unit of the video information;
realtime transport protocol (RTP) packetizing the encrypted network abstraction layer unit of the video information, wherein the encrypted network abstraction layer unit is loaded on a payload of an RTP packet;
recording the extracted NAL Unit Type information and DID, TID and QID information in a header extension field of an RTP header of the RTP packet without encryption; and
transmitting the RTP packet including the encrypted video information and the unencrypted NAL Unit Type information and DID, TID and QID information to a routing device.

2. The method of claim 1, further comprising:
   storing the extracted NAL Unit Type information in a memory.

3. The method of claim 1, wherein the video information is information in a scalable video coding type.

4. The method of claim 1, wherein the generating of the network abstraction layer unit using received video information generates the network abstraction layer unit by compressing the received video information.

5. The method of claim 1, wherein, when the encrypted network abstraction layer unit of the video information is RTP packetized, a header space of the RTP is extended.

6. A method of routing a secured information packet in a video multicasting service, the method comprising:
   receiving an RTP packet including an encrypted network abstraction layer unit of video information and unencrypted format information and dependency_ID (DID), temporal_level_ID (TID) and quality_level_ID (QID) information;
   extracting unit the unencrypted format information and DID, TID and QID information from a header extension field of an RTP header of the received RTP packet; and
   transmitting the network abstraction layer unit to a client terminal corresponding to the extracted network abstraction layer (NAL) Unit Type information and the DID, TID and QID information.

7. The method of claim 6, wherein the extracting of the NAL Unit Type information and DID, TID and QID information, included in a network abstraction layer, does not perform information decoding, RTP information packetizing, and information encryption.

8. An apparatus for maintaining information security in a video multicasting service, the apparatus comprising:
   a unit generator generating a network abstraction layer unit using received video information, the network abstraction layer of the video information including unit format NAL Unit Type information and dependency_ID (DID), temporal_level_ID (TID) and quality_level_ID (QID) information;
   a memory extracting the unit format network abstraction layer (NAL) Unit Type information and DID, TID and QID information from the network abstraction layer unit of the video information to store the extracted NAL Unit Type information and DID, TID and QID information;
   an information encryption module encrypting the network abstraction layer unit of the video information;
   an information packetizer RTP packetizing the encrypted network abstraction layer unit of the video information, wherein the encrypted network abstraction layer unit of the video information is loaded on a payload of an RTP packet;
   an information recorder recording the extracted NAL Unit Type information and DID, TID and QID information in a header extension field of an RTP header of the RTP packet without encryption; and
   an information transmitter transmitting the RTP packet including the encrypted video information and the unencrypted NAL Unit Type information and DID, TID and QID information to a routing device.

9. The apparatus of claim 8, wherein the unit generator generates the network abstraction layer unit by compressing the received video information.

10. The apparatus of claim 8, wherein, when the encrypted network abstraction layer unit of the video information is RTP packetized, a header space of the RTP is extended.

11. An apparatus for routing a secured-information packet, the apparatus comprising:
   a receiver receiving an RTP packet including an encrypted network abstraction layer unit of video information and unencrypted NAL Unit Type information and dependency_ID (DID), temporal_level_ID (TID) and quality_level_ID (QID) information;
   an extractor extracting the unencrypted network abstraction layer (NAL) Unit Type information and DID, TID and QID information from a header extension field of an RTP header of the received RTP packet; and
   a transmitter transmitting the network abstraction layer unit to a client terminal corresponding to the extracted NAL Unit Type and field DID, TID and QID information.

12. The apparatus of claim 11, wherein the extractor extracts does not perform information decoding, RTP information packetizing, and information encryption.

13. A decoder comprising:
   a receiver receiving a network abstraction layer unit from a routing device; and
   a decoding module decoding the received network abstraction layer unit corresponding to a client terminal,
   wherein the routing device receives an RTP packet including an encrypted network abstraction layer unit of video information and unencrypted network abstraction layer (NAL) Unit Type information and dependency_ID (DID), temporal_level_ID (TID) and quality_level_ID (QID) information, extracts the unencrypted NAL Unit Type information and DID, TID and QID information from a header extension field of an RTP header of the received RTP packet, and transmits the network abstraction layer unit to the receiver corresponding to the extracted NAL Unit Type information and DID, TID and QID information.

* * * * *